C. F. BURGESS.
BATTERY HAND LAMP.
APPLICATION FILED MAY 21, 1917.
1,297,654.
Patented Mar. 18, 1919.
2 SHEETS—SHEET 1.
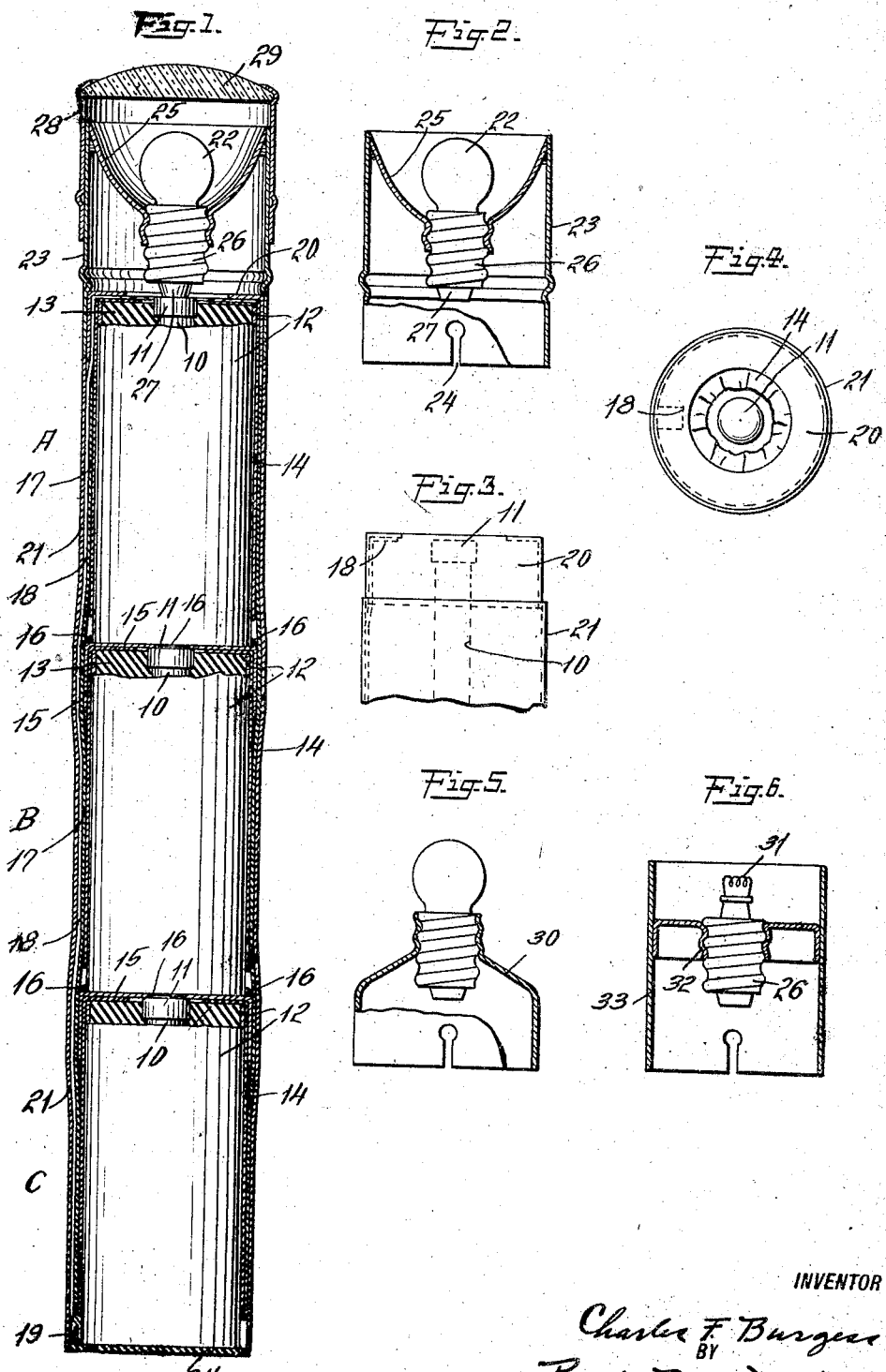
INVENTOR
Charles F. Burgess
BY
Penrie Davis Marius Edmunds
ATTORNEYS

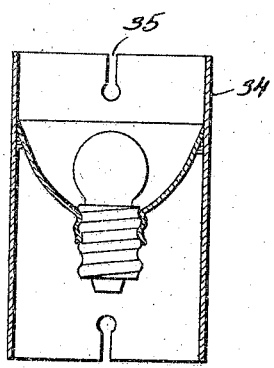
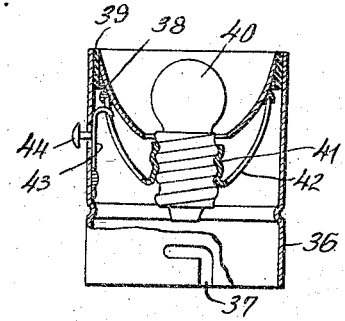
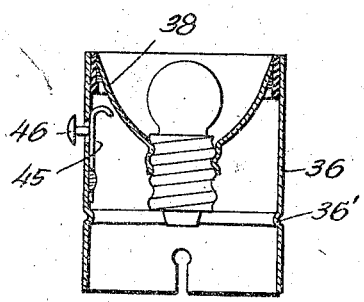
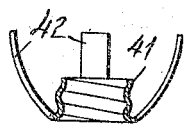
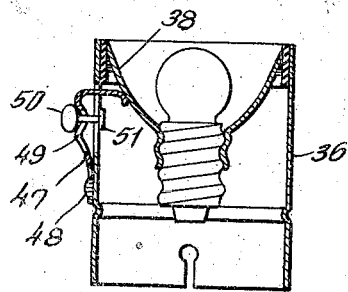
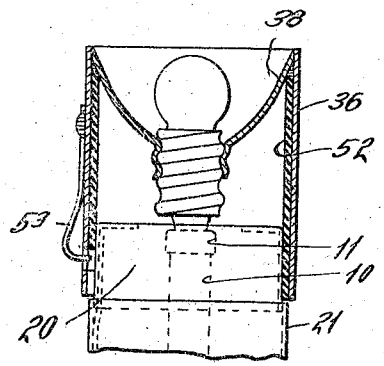

UNITED STATES PATENT OFFICE.

CHARLES F. BURGESS, OF MADISON, WISCONSIN, ASSIGNOR TO BURGESS BATTERY COMPANY, A CORPORATION OF WISCONSIN.

BATTERY HAND-LAMP.

1,297,654.   Specification of Letters Patent.   Patented Mar. 18, 1919.

Application filed May 21, 1917. Serial No. 169,869.

*To all whom it may concern:*

Be it known that I, CHARLES F. BURGESS, a citizen of the United States, residing at Madison, in the county of Dane, State of Wisconsin, have invented certain new and useful Improvements in Battery Hand-Lamps; and I do hereby declare the following to be a full, clear, and exact description of the invention, such as will enable others skilled in the art to which it appertains to make and use the same.

The present invention relates to battery hand lamps of a type in which the battery is composed of a plurality of dry cells permanently connected together to form a unitary, rigid structure, which is serviceable as the body or handle of the device, and to one end of which a lamp may be detachably connected. In hand lamps of the present invention, the battery or body portion may be discarded when the cells of the battery become exhausted and a new battery substituted. The initial cost of the complete equipment is low, and is compared with many hand lamps now in use, there is a very considerable reduction in weight through elimination of the heavy fiber or metal casing in which the batteries of such devices are housed.

It is an object of the present invention to provide a battery construction and a mode of attachment for the lamp and associated parts which are simple, convenient and reliable. Other objects and advantages of the invention will be apparent from a description of certain preferred embodiments thereof as illustrated in the accompanying drawings, in which—

Figure 1 shows a complete device comprising a battery with a lamp attached thereto;

Fig. 2 is a view in section of the support for the lamp;

Fig. 3 is a view of the end of the battery with the lamp casing removed;

Fig. 4 shows the top of the battery;

Fig. 5 represents a modified form of lamp in which no reflector is used;

Fig. 6 represents a modification of the invention adapted as a gas lighter;

Figs. 7 to 12 inclusive represent various other modifications of the lamp support, some of which have switches associated therewith for controlling the lamp circuit.

Referring to the drawings, in which similar reference characters denote similar parts throughout the several views, the battery shown in Fig. 1 is composed of three dry cells A, B and C. Each of the cells has a carbon electrode 10 tipped with a metallic cap 11 which forms one terminal thereof. The other electrode of each cell is in the form of a zinc cup 12 which also serves as a container for the electrolytic paste and the depolarizing material which constitute parts of each cell. The paste and material are retained within the cell by the pitch seal 13. The foregoing details may be varied in many ways. A wrapping of impregnated paper or other suitable material 14, preferably waterproofed, surrounds the zinc cup except for a small portion near the bottom thereof. This wrapping is turned over the top of the cell and extends inwardly toward the metallic cap 11, as shown in Fig. 4. Each of the cells of the battery, except the first one A, has fitted tightly upon its upper end a metallic cap 15 which extends inwardly far enough to engage the upper face of terminal 11 to which it preferably is soldered. When the cells are placed together as shown in Fig. 1 the zinc cup of one cell rests upon the cap 15 of an adjacent cell, but in order to make a better electrical contact and to attach the cells rigidly together, solder may be applied at a number of places as indicated at 16. The entire number of cells thus rigidly connected together in series connection and constituting the battery are wrapped with a covering 17 of paper or other suitable insulating material. The paper may be waterproofed. A conducting strip 18 is attached at its lower end 19, to the exposed zinc cup of the third cell C. The conducting strip extends to the other end of the battery where it is firmly held beneath and makes electrical connection with a terminal cap 20 forced tightly over the outer end of the cell A and provided with an aperture through which access may be obtained to the terminal 11, as shown in Fig. 4. To protect the conducting strip 18, the entire battery, except for the cap 20, is covered with a wrapping of paper, cloth or other suitable material 21, and if desired this wrapping may be waterproofed before or after its application, as with china wood oil, or with paraffin or the like. The bottom of the battery may be covered by a disk or cap 21' also of insulating material, or the side wrapping may be folded in over the bottom of the lowermost cell.

With the construction above described, the two terminals of the battery are adjacent to one another in convenient relation for ready attachment to a current-consuming device. In Fig. 1 the attached device is an incandescent lamp 22 mounted within a casing 23 formed of a size to fit snugly over the terminal cap 20. The end of the casing which fits over the end of the battery can be slotted as at 24 to provide a spring fit to retain the lamp and its casing securely in place upon the end of the battery, or other special means can be resorted to for securing an effective connection. The lamp itself is held within the casing 23 by a concave support 25 which may be polished to act as a reflector and which is provided at its inner end with a screw-threaded socket adapted to receive the base 26 of the lamp. The inner terminal 27 of the lamp engages cap 11 which constitutes the other battery terminal. The lamp may be lighted or extinguished by screwing it into or out of the socket or by sliding casing 23 on cap 20 until the inner lamp terminal touches or fails to touch cap 11. Surrounding the casing 23 is a sleeve 28, to the outer end of which is fastened a lens 29. Since the sleeve 28 is slidably mounted on the casing 23, the lens may be adjusted to vary the angular width or focus of the beam of light emitted by the lamp. The lamp may be used without the lens and lens-support, if desired, as shown in Fig. 2.

In Fig. 5 is shown a support for a lamp in which no reflector is used, the cap 30 supporting the lamp and fitting over the end of the battery, as does the casing 23 of Figs. 1 and 2.

Fig. 6 illustrates a modification of the invention adapted for use as a gas lighter. In this case the lamp is replaced by a coil of platinum wire 31 which is connected to a base 26 similar to the base of an incandescent lamp. This base may be screwed into a socket 32 formed in the shape of a cup and set within the casing 33. The latter slips over the end of the battery. Circuit is completed through the platinum wire 31 just as through the filament of the incandescent lamps of the other figures.

Fig. 7 illustrates a mounting for the lamp similar to that shown in Fig. 2, but it is provided with an extended portion 34 which has slots 35 so that it may be inverted and fitted over the end of the battery to protect the lamp, when not in use. Certain features illustrated in Fig. 7 are claimed in my co-pending application Serial No. 169,871 of even date herewith.

Oftentimes, in devices of this construction, it will be found advisable to provide a switch for controlling the lamp circuit, and one arrangement for this purpose is shown in Fig. 8, in which the casing 36 is provided with slots 37 adapted to fit over pins on the end of the battery cap 20 to form a bayonet joint by which the casing may be securely attached to the battery. The reflector 38 is insulated from the casing by a ring 39 of non-conducting material such as fiber. In this arrangement the lamp 40 instead of being attached to a socket at the bottom of the reflector is carried by a socket 41 which is attached and electrically connected to the reflector by four spring fingers 42. This arrangement gives a certain flexibility to the lamp support so that when the casing is attached to the end of the battery by means of the bayonet joint the lamp will be held in firm but yielding contact with the terminal 11 of the battery. To control the lamp circuit, a switch is mounted within the casing 36. This switch may comprise a spring member 43 bent over at its upper end far enough to come in contact with the outside of the reflector 38 when the spring is pushed inwardly by means of a button 44 which extends through a slot in casing 36.

Another arrangement of lamp support and switch is shown in Fig. 10, but in this case the bayonet joint has not been used and the casing 36 may be slipped over the end of the battery until the swage 36' strikes the top edge of cap 20 and the inner terminal of the lamp is firmly in contact with the terminal 11 of the battery. The switch of this modification comprises a spring finger 45 attached at one end to the interior of the casing 36, as shown, and adapted to be pushed inwardly against the reflector 38 by means of a push button 46 extending through an aperture in the casing.

In Fig. 11 the lamp is mounted in the reflector and the casing is intended to be slipped over the end of the battery as in Fig. 10, but a different form of switch mechanism is shown. This comprises a spring finger 47 attached to the outside of the casing as at 48 and extending through a slot in the casing. The spring is provided with a longitudinal slot 49 through which passes the shank 50 of a button, the inner end of which has an enlarged head 51 which holds it in place within a slot in the casing 36. When the button is in the position indicated in the figure, contact spring 47 engages the reflector to establish the lamp circuit, but if the button be pushed downwardly it will reach a portion of the slot in the spring finger which will permit the latter to spring outwardly, thus breaking the circuit.

In Fig. 12, a somewhat different arrangement is shown, in which the casing 36 and reflector 38 are electrically continuous, but the casing is insulated from the end of the battery upon which it is seated, by a lining of fiber insulation 52. In order to complete the lamp circuit, a spring finger 53 is attached to the outside of the casing and its free end is bent inwardly and extends through an aperture in the casing into proximity to the outer terminal 20 of the battery. The spring finger is normally out of contact with this terminal but when pressed inwardly establishes a circuit from the terminal through the casing and the reflector to the base of the lamp. The inner terminal of the lamp base engages the inner terminal of the battery, as in the other figures. This embodiment is non-short-circuiting in the sense that there are no exposed metal parts which when bridged by contact with metal tools will cause the lamp to light up accidentally and thus needlessly exhaust the battery.

Throughout the several embodiments above described, many features of design and arrangement may be changed without departing from the spirit of my invention, as defined by the appended claims.

I claim:—

1. In combination, a plurality of dry cells, means connecting said cells end to end in rigid relation and in series connection, a collar embracing the sides and top of the topmost cell and insulated therefrom, a conductor leading from the lowermost cell to said collar, an insulating wrapping for said rigidly connected cells and said conductor, a casing slipped over said collar, a reflector secured to said casing, and a lamp carried by said reflector, substantially as described.

2. In combination, a plurality of dry cells, means connecting said cells end to end in rigid relation and in series connection, a collar encircling the topmost cell and insulated therefrom, a conductor leading from the lowermost cell to said collar, an insulating wrapping for said cells and said conductor, a casing slipped over said collar, a lamp support secured to said casing and insulated from said collar, a lamp in said support, and switch mechanism for electrically connecting said lamp with said collar to light said lamp.

3. In combination, a battery comprising a plurality of dry cells electrically connected in series and having a central terminal of one polarity and an adjacent terminal of opposite polarity, a lamp connected with said central terminal, a casing contacting with said adjacent terminal, a support wherein said lamp is mounted, said support being secured to said casing but normally insulated therefrom, and switch mechanism for connecting said support to said casing when the lamp is to be lighted.

4. In combination, a battery comprising a plurality of dry cells electrically connected in series and having a central terminal of one polarity and an adjacent annular terminal of opposite polarity, a lamp contacting with said central terminal, a casing contacting with said annular terminal, and a reflector whereon said lamp is mounted on yielding arms.

5. In combination, a battery comprising a plurality of dry cells electrically connected in series and having a central terminal of one polarity and an adjacent annular terminal of opposite polarity, a lamp contacting with said central terminal, a casing contacting with said annular terminal, a reflector whereon said lamp is mounted on yielding arms, said reflector being secured to said casing but normally insulated therefrom, and switch mechanism for connecting said reflector to said casing when the lamp is to be lighted.

6. In a hand lamp, the combination of a casing, a reflector therein and insulated therefrom, a lamp support yieldingly connected to said reflector, a lamp therein and switch mechanism for establishing electrical connection from said casing to said lamp when desired.

7. In a hand lamp, the combination of a battery, a casing, a lamp therein, a threaded lamp support movable in said casing, and means securing said support to said casing and normally holding said lamp in yielding engagement with a battery terminal, substantially as described.

8. A device of the character described, comprising, in combination, a battery having an inner terminal of one polarity and an outer terminal of opposite polarity, a casing adapted to be slipped over and detachably secured in contact with said outer terminal, a support within said casing provided with a socket, an incandescent lamp provided with outer and inner circuit terminals adapted to contact with said socket and said inner battery terminal respectively and contact mechanism in said casing for controlling the flow of current through said lamp.

9. A device of the character described, comprising, in combination, a battery having an inner terminal of one polarity and an outer terminal of opposite polarity, a casing adapted to be detachably secured to said battery in contact with said outer terminal, a support within and insulated from said casing, a socket on said support, an electrical translating device provided with outer and inner circuit terminals adapted to contact with said socket and said inner battery terminal respectively, and means for electrically connecting said casing and said support to establish the circuit of said translating device.

10. A device of the character described, comprising, in combination, a battery having an inner terminal of one polarity and an outer terminal of opposite polarity, a casing adapted to be detachably secured to said battery in contact with said outer terminal, a support within and insulated from said casing, a socket on said support, an electrical translating device provided with outer and inner circuit terminals adapted to contact with said socket and said inner battery terminal respectively, and switch mechanism mounted on said casing for electrically connecting said casing and said support to establish the circuit of said translating device.

In testimony whereof I affix my signature.

CHARLES F. BURGESS.